T. GRAHAM.
FRICTION TOP CAN.
APPLICATION FILED JAN. 13, 1911.
1,022,074.
Patented Apr. 2, 1912.
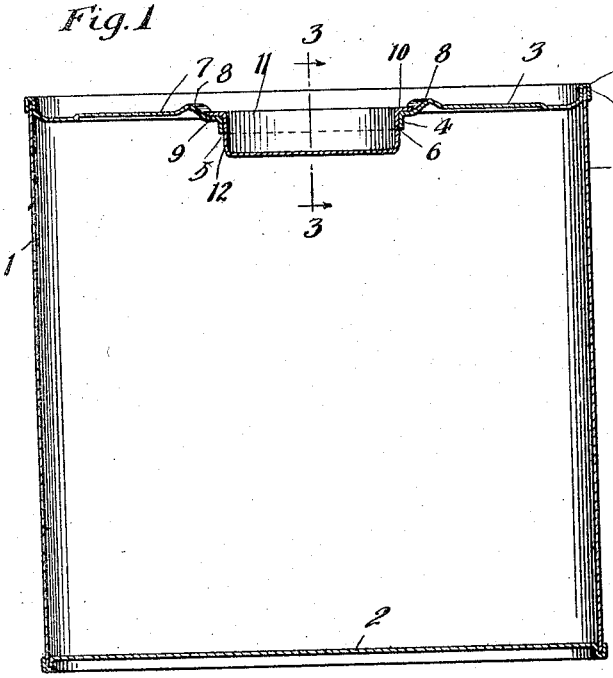
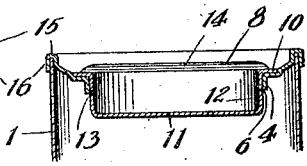
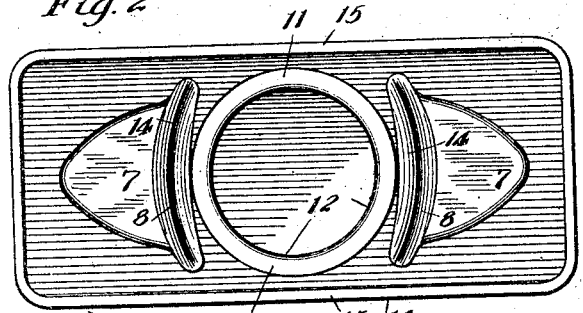
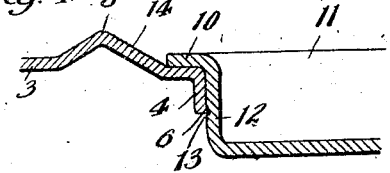
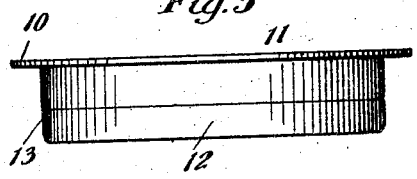
Witnesses:
Wm. Geiger
Inventor:
Thomas Graham
By Munday, Evarts, Adcock & Clarke,
Attys

UNITED STATES PATENT OFFICE.

THOMAS GRAHAM, OF BALTIMORE, MARYLAND, ASSIGNOR TO AMERICAN CAN COMPANY, OF NEW YORK, N. Y., A CORPORATION OF NEW JERSEY.

FRICTION-TOP CAN.

1,022,074.   Specification of Letters Patent.   Patented Apr. 2, 1912.

Application filed January 13, 1911. Serial No. 602,509.

*To all whom it may concern:*

Be it known that I, THOMAS GRAHAM, a citizen of the United States, residing in the city of Baltimore and State of Maryland, have invented a new and useful Improvement in Friction-Top Cans, of which the following is a specification.

My invention relates to improvements in friction top cans.

The object of my invention is to provide an improved construction of friction top can by which an extraordinary tight closure may be obtained, and the friction cap, plug or cover securely held or locked in position within the friction seat wall or flange of the top head of the can, and which at the same time will be of simple construction and adapted to be cheaply manufactured and furnished at small cost. To practically accomplish this object or result, and herein my invention consists, I provide the vertical or substantially cylindrical friction seat wall of the friction cap, plug or cover with a minute, circumferentially extending score in the horizontal plane of the lower edge of the depending friction seat wall or flange of the top head when the cap or cover is forced home, where it will be engaged with more or less of a spring-like action by the lower inner edge of the depending friction seat wall or flange of the top head, the score thus having a barb-like or locking action in conjunction with the bur edge of the friction flange of the top head in holding and locking the friction cap or cover very firmly and securely in place and thereby very greatly adding to the tightness and perfection of the closure.

In the accompanying drawing forming a part of this specification, Figure 1 is a central, vertical section of a friction plug oyster can embodying my invention. Fig. 2 is a plan view. Fig. 3 is a detail, partial, vertical section on line 3—3 of Fig. 1. Fig. 4 is an enlarged detail section in which the thickness of the sheet metal or tin plate and the depth and size of the locking score in the peripheral wall of the plug is greatly exaggerated to better illustrate the invention. Fig. 5 is an enlarged, detail elevation of the friction cap plug or cover of the can.

In the drawing, I have illustrated my invention as applied to an oyster shipping can, in which class of cans it is particularly useful, as they ordinarily have a bottom head of soft, light, tin plate adapting it to be readily cut out to open the can. In this kind of cans, the circumstance that the friction cap or plug of my improved can is capable of being removed only with great difficulty, is of no consequence or objection, as consumers ordinarily open these cans by cutting out the soft tin bottom head.

In the drawing, 1 represents the body of the can, 2 its bottom head soldered thereto, preferably made of thin, soft tin adapted to be readily cut out, 3 is the top head soldered to the body and provided with a depending friction seat wall or flange 4, surrounding its filling opening 5. The friction seat wall or flange 4 has the customary inward spring action and bur 6 at its extreme inner lower edge. The top head 3 is further provided with raised stiffening bosses 7 at each side of the central opening, and with curved, transversely extending raised ribs 8 adjacent to its friction flange or seat wall and with an annular recess or seat 9 to receive the outstanding pry-off rim or flange 10 of the friction cap plug or cover 11.

The friction cap, plug or cover, (as this member is commonly or variously termed,) has a substantially cylindrical but slightly tapering friction seat wall 12 adapted to very tightly fit and engage the corresponding friction seat wall or flange 4 of the top head, and it is provided with a very fine or minute circumferential score 13 extending around it in a horizontal plane, and on a level with or at the depth of the extreme lower edge or bur 6 of the friction flange or seat wall 4 of the top head, and adapted to be engaged thereby with more or less of a barb-like or spring action, and thus serve to very securely hold and lock the friction cap in place and cause the closure to be one of extraordinary tightness and security. This score 13 in the peripheral friction seat wall of the cap 11 may, in practice, be so fine that it can scarcely be seen with the naked eye and scarcely felt with the finger nail, and I find in practice that it will nevertheless serve to hold and lock the friction cap so securely in place that it can be pried off or removed only with great difficulty. To enable it, however, to be pried off or removed when desired, the adjacent inclined wall 14 of the raised rib 8 is continued to intersect with the horizontal face of the recess or seat 9, which receives the pry-off rim 10 of the friction cap or plug. This enables a pointed or blade-like instrument to be wedged under the pry-off rim 10 of the friction cap. The raised ribs 8 of the top head serve as pry-off rims or fulcrums in removing the cover, as do also the portions 15 of the seam rim 16 which unites the top head to the body of the can.

The circumferentially extending locking score 13 on the friction seat wall of the cap 11 is preferably of V shape in cross section, as will be readily understood from the exaggerated representation of it in Fig. 4, and the lower wall of the V groove preferably makes a greater angle to the vertical than the upper wall to increase the barb-like action of the score in resisting removal of the friction cap.

As in my invention, the interengaging friction seat walls of both members, the top head and friction cap, are made of plain shape, without distortion, folding or grooving of the sheet metal, both parts are adapted to be very cheaply manufactured and also to be forced or wedged together very tightly and snugly.

As in my invention, the circumferential fine score 13 on the external friction seat wall 12 of the friction cap 11 produces no external hump, rib or projection on the smooth friction seat wall 12, it does not interfere with the necessary close metal to metal contact of the friction faces or walls of the cap and top head when the parts are forced together, and thus enables a fluid tight closure to be practically secured by simply driving or forcing the cap into the opening of the top head by straight, downward pressure upon the pry-off rim of the cap. The horizontal annular pry-off rim of the cap, by engagement with the flat lower face of the piston or plunger, which is used to close the cans, serves also to cause the cap to enter the opening in the top head truly and without tendency to tilt. My improved cans are thus adapted to be very rapidly and cheaply closed in the oyster packing factory.

Where my invention is used in cans having thin, soft metal bottom heads to be cut out, the can is opened ordinarily without removing the friction cap 11. In cases, however, where my invention is used in cans not having thin, soft, metal bottom heads, they may be opened, although with some difficulty, by prying off the friction covers. In practicing my invention, if the friction cap is forced in closing the can so far in that the circumferential score 13 comes a little below the lower edge 6 of the top head flange 4, the score will still be effective in preventing the removal or displacement of the cover, as it will be engaged by the bur at the lower edge of the top head flange if the cover should move slightly upward or outward.

The stiffening bosses 7 and raised ribs 8 serve to stiffen the top head of the can and adapt it to resist the pressure of the piston or plunger of the closing machine in forcing the cover tightly into the can.

I claim:—

1. In a friction top can, the combination with a top head having a depending friction seat wall flange, of a coöperating friction closure member having a friction seat wall provided with a fine, circumferential score engaging the inner lower edge of the friction seat wall flange of the top head to hold and lock said member in place and increase the tightness of the closure, substantially as specified.

2. In a friction top can, the combination with a top head having a depending friction seat wall flange with an inward spring action at its lower edge, of a friction cap having a friction seat wall provided with an external, circumferential score engaging the lower edge of the friction seat wall flange of the top head with a barb-like locking action to hold the friction cap in position and effect a tight closure, substantially as specified.

THOMAS GRAHAM.

Witnesses:
FRANK MURPHY,
IRVING L. FORD.